United States Patent

Pfeiffer

(10) Patent No.: US 6,561,015 B1
(45) Date of Patent: May 13, 2003

(54) MODEL-BASED METHOD OF ESTIMATING CRANKCASE OIL PRESSURE IN AN INTERNAL COMBUSTION ENGINE

(75) Inventor: Jeffrey M. Pfeiffer, Walled Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/126,496

(22) Filed: Apr. 19, 2002

(51) Int. Cl.$^7$ .............................................. G01M 19/00
(52) U.S. Cl. ....................... 73/118.1; 73/116; 73/117.2; 73/117.3
(58) Field of Search ................................ 73/118.1, 116, 73/117.2, 117.3

(56) References Cited

U.S. PATENT DOCUMENTS 5,361,628 A * 11/1994 Marko et al. .................. 73/116
6,294,988 B1 * 9/2001 Shomura ..................... 340/438
6,449,538 B1 * 9/2002 Kubo et al. ..................... 701/30

\* cited by examiner

*Primary Examiner*—Hezron Williams
*Assistant Examiner*—Corey D. Mack
(74) *Attorney, Agent, or Firm*—Vincent A. Cichosz

(57) ABSTRACT

An improved method of estimating the oil pressure of an internal combustion engine utilizes a physical model that takes into account both engine speed and engine oil temperature. The oil pressure is estimated as the sum of static and dynamic components, where the dynamic component includes a first portion that primarily models flow-related effects, and a second portion that primarily models temperature-related effects. The constants and temperature-related variables of the physical model are combined to form one constant calibration value, and two temperature-dependent calibration values. The parameters of the physical model provide a starting point for the calibration values, and the calibration values are then tuned during a calibration procedure so that the estimated oil pressure tracks an accurate measure of the oil pressure during both steady-state and transient engine operating conditions.

5 Claims, 1 Drawing Sheet

MODEL-BASED METHOD OF ESTIMATING CRANKCASE OIL PRESSURE IN AN INTERNAL COMBUSTION ENGINE

TECHNICAL FIELD

The present invention relates to a model-based method of estimating the crankcase oil pressure of an internal combustion engine.

BACKGROUND OF THE INVENTION

An accurate indication of crankcase oil pressure in an internal combustion engine is useful for control purposes, such as for scheduling the gain of control algorithms for systems that are sensitive to oil pressure fluctuations. For example, in an engine equipped with a hydraulically activated variable valvetrain system, the control algorithm gains should be matched with the actuator response time, which varies with engine oil pressure. Although the engine oil pressure may be measured directly with a dedicated sensor, the usual oil pressure sensors are not very accurate, and most automotive manufacturers rely on an estimate of the oil pressure to avoid the expense of a better sensor when a more accurate pressure indication is needed. For example, the oil pressure that occurs for different steady-state operating conditions of the engine (different values of engine speed, or different combinations of engine speed and oil temperature, for example), can be measured and stored in a look-up table for subsequent retrieval during operation of the engine. However, such estimation techniques typically require extensive calibration effort, and tend to perform poorly during transient engine operating conditions. Accordingly, what is needed is an estimation method for use in a production vehicle that is relatively easy to calibrate and that provides an accurate estimation of the engine oil pressure during both steady-state and transient engine operating conditions.

SUMMARY OF THE INVENTION

The present invention is directed to an improved method of estimating the crankcase oil pressure of an internal combustion engine with a physical model that takes into account both engine speed and oil temperature. According to the invention, the oil pressure is estimated as the sum of static and dynamic components, where the dynamic component includes a first portion that primarily models flow-related effects, and a second portion that primarily models temperature-related effects. In a preferred embodiment, the constants and temperature-related variables of the physical model are combined to form one constant calibration value, and two temperature-dependent calibration values. The parameters of the physical model provide a starting point for the calibration values, and the calibration values are then tuned during a calibration procedure so that the estimated oil pressure tracks an accurate measure of the oil pressure during both steady-state and transient engine operating conditions.

DESCRIPTION OF THE PREFERRED EMBODIMENT

Figure 1:
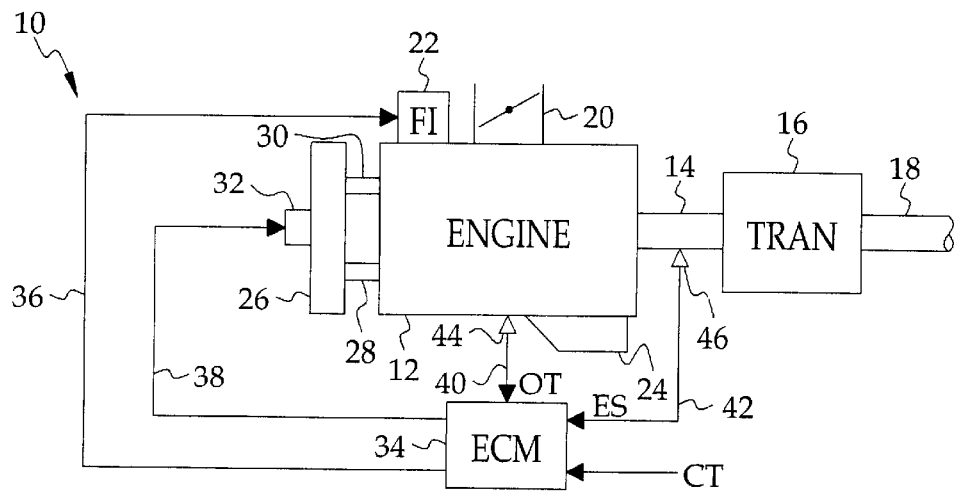
FIG. 1 is a diagram of a typical motor vehicle powertrain and a microprocessor-based engine control module programmed to carry out the engine oil pressure estimation method of this invention.

Referring to FIG. 1, the reference numeral 10 generally designates a powertrain for a motor vehicle, including an internal combustion engine 12 having an output shaft 14 and a power transmission 16 coupling engine output shaft 14 to a drive shaft 18. The engine 12 includes a throttle valve 20 through which intake air is ingested, and a fuel injection (FI) system 22 for injecting a precisely controlled quantity of fuel for mixture with the intake air and combustion in the engine cylinders (not shown).

An oil pump driven by the engine 12 pumps crankcase oil through a series of internal passages for lubricating moving parts of engine 12 and removing heat generated due to combustion and friction. Heat added to the engine oil is transferred to the atmosphere primarily due to passage of ambient air across the oil pan 24 and to engine coolant that is pumped through the engine water jacket to regulate the engine operating temperature. A radiator 26 coupled to the engine water jacket via hoses 28 and 30 transfers engine coolant heat to the atmosphere, and an electrically driven fan 32 can be turned on to increase the heat transfer rate.

As indicated in FIG. 1, the fuel injection system 22 and cooling fan 32 are controlled by a microprocessor-based engine control module (ECM) 34 via lines 36 and 38 in response to various inputs such as coolant temperature CT. Additionally, ECM 34 receives an engine speed signal on line 42 and an engine oil temperature (OT) signal on line 40. The engine oil temperature signal OT may be obtained with temperature sensor 44, and the engine speed ES may be obtained with speed sensor 46.

The present invention is directed to a method of operation carried out by ECM 34 for estimating the pressure of the engine oil according to the sum of a static pressure component Ps and a dynamic pressure component Pd; that is:

$$OPest = Ps + Pd \tag{1}$$

where OPest is the estimated engine oil pressure. The static pressure component Ps is the pressure that would be measured if the pressure measuring device were moving with the oil flow, and is represented herein as a calibration term C1 having a fixed value. The dynamic pressure component Pd, on the other hand, depends on both the oil density Doil and its flow velocity Voil, as follows:

$$Pd = 0.5 * Doil * Voil^2 \tag{2}$$

The oil density Doil, in turn, varies as a function of the oil temperature OT, as follows:

$$Doil = Dref + Dot * (OT - Tref) \tag{3}$$

where Tref is a reference temperature, Dref is the density of the oil at the reference temperature Tref, and Dot is a density term that varies as a function of oil temperature OT. Additionally, empirical testing has shown that the square root of engine speed ES (i.e., $ES^{1/2}$) can be used as a close approximation of the term $Voil^2$ in equation (2). Thus, the estimated oil pressure OPest can be given as:

$$OPest = C1 + (C2 * ES^{1/2}) + (C3 * OT * ES^{1/2}) \tag{4}$$

where C2 is a flow-related calibration factor, and C3 is a temperature-related calibration factor. Rearranging the above equations reveals that C2 and C3 have the following nominal values:

$$C2 = 0.5 * (Dref - Dot * Tref) \tag{5}$$

$$C3 = 0.5 * Dot \qquad (6)$$

In other words, the OPest is determined according to the sum of Ps (represented by the fixed calibration term C1) and Pd, where Pd includes a first portion (C2 * $ES^{1/2}$) that primarily models flow-related effects, and a second portion (C3 * OT * $ES^{1/2}$) that primarily models temperature-related effects.

Figure 2:
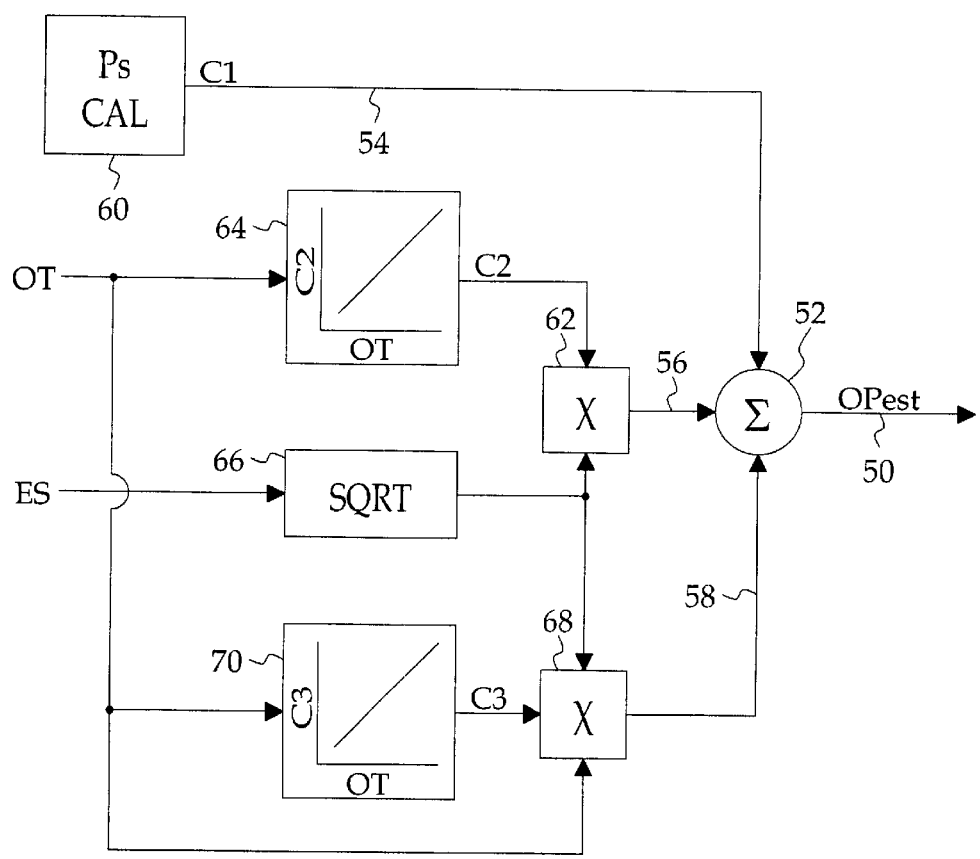
FIG. 2 is a block diagram representative of a software routine executed by the engine control module of FIG. 1 in carrying out the engine oil pressure estimation method of this invention.

The above-described estimation method is outlined by the block diagram of FIG. 2, where the measured engine speed ES and oil temperature OT are provided as inputs for developing the estimated oil pressure OPest on line 50. As indicated by summation block 52, OPest is determined as the sum of a static pressure signal on line 54, a flow-related dynamic signal on line 56 and a temperature-related dynamic signal on line 58. The static pressure signal on line 54 is a fixed calibration value C1, as designated by the Ps calibration block 60. The flow-related dynamic signal on line 56 is the output of multiplication block 62, and represents the product (C2*$ES^{1/2}$), where look-up table 64 gives calibration term C2 as a function of the input OT, and square root (SQRT) function table 66 gives $ES^{1/2}$ as a function of the input ES. Finally, the temperature-related dynamic signal on line 58 is the output of multiplication block 68, and represents the product (C3* OT*$ES^{1/2}$), where look-up table 70 gives calibration term C3 as a function of the input OT.

The nominal values of calibration terms C1, C2 and C3 can be determined empirically and/or theoretically as indicated above, and the process of tuning the calibration values C1, C2, C3 for a given engine 12 or engine-type involves instrumenting the engine 12 for accurately measuring the actual oil pressure OPact, ramping the engine speed ES up and down as the engine 12 warms up following a cold start, and adjusting one or more of the calibration values C1, C2 and C3 so that the estimated oil pressure OPest closely tracks OPact. In general, the flow-related calibration factor C2 is adjusted to correctly account for relatively fast changes in oil pressure as the engine speed ES quickly changes, the temperature-related calibration factor C3 is adjusted to correctly account for relatively slow changes in oil pressure that occur due to increasing oil temperature, and the static calibration term C1 is adjusted to offset the estimated dynamic pressure Pd. Once properly calibrated, the calibration tables and values are stored in ECM 34 for use in periodically executing a software oil pressure estimation routine based on the block diagram of FIG. 2.

In summary, the present invention provides an easily implemented and reliable estimate of the crankcase oil pressure in an internal combustion engine with a physical model that takes into account both engine speed and oil temperature. While the invention has been described in reference to the illustrated embodiment, it is expected that various modifications in addition to those mentioned above will occur to those skilled in the art. For example, the various input values to ECM 34 such as the oil temperature OT may be estimated instead of measured, the look-up tables 64, 66 may be replaced by mathematical models, and soon. Thus, it will be understood that methods incorporating these and other modifications may fall within the scope of this invention, which is defined by the appended claims.

What is claimed is:

1. A method of estimating a pressure of oil in an internal combustion engine, comprising the steps of:

determining a speed of the engine and a temperature of the oil; and utilizing the determined engine speed and oil temperature to estimate the oil pressure as a sum of static and dynamic components, where the dynamic component includes a first portion that primarily accounts for flow-related effects on the oil pressure, and a second portion that primarily accounts for temperature-related effects on the oil pressure.

2. The method of claim 1, wherein said static component is represented by a calibration term having a fixed value.

3. The method of claim 1, wherein the first and second portions of the dynamic component include calibration terms that vary as a function of the determined temperature of the oil.

4. The method of claim 1, including the step of:

determining the first portion of the dynamic component according to a product (C2*$ES^{1/2}$), where C2 is a calibration term that varies as a function of the determined temperature of the oil, and ES is the determined speed of the engine.

5. The method of claim 1, including the step of:

determining the second portion of the dynamic component according to a product (C3*OT*$ES^{1/2}$), where C3 is a calibration term that varies as a function of the determined temperature of the oil, OT is the determined temperature of the oil, and ES is the determined speed of the engine.

* * * * *